United States Patent [19]

Harriehausen et al.

[11] Patent Number: 5,244,269
[45] Date of Patent: Sep. 14, 1993

[54] OVERHEAD BAGGAGE COMPARTMENT WITH A LOWERABLE TROUGH

[75] Inventors: Michael Harriehausen, Hamburg; Dieter Kasch, Buxtehude; Heinz Manthey, Hamburg, all of Fed. Rep. of Germany

[73] Assignee: Deutsche Aerospace Airbus GmbH, Bremen, Fed. Rep. of Germany

[21] Appl. No.: 942,974

[22] Filed: Sep. 10, 1992

[30] Foreign Application Priority Data

Sep. 14, 1991 [DE] Fed. Rep. of Germany ....... 4130644

[51] Int. Cl.⁵ ............................................. A47B 81/00
[52] U.S. Cl. .................................... 312/247; 312/266; 312/319.1
[58] Field of Search ............... 312/266, 276, 246, 247, 312/248, 319.1

[56] References Cited

U.S. PATENT DOCUMENTS

| | | | |
|---|---|---|---|
| 3,539,239 | 11/1970 | Mallonn | 312/248 |
| 4,275,942 | 6/1981 | Steidl | |
| 4,285,557 | 8/1981 | Paladino | 312/248 |
| 4,368,937 | 1/1983 | Palombo | 312/269 |
| 4,723,680 | 2/1988 | Carroll | 312/246 |
| 4,733,925 | 3/1988 | Duran | 312/247 |

Primary Examiner—Kenneth J. Dorner
Assistant Examiner—Gerald Anderson
Attorney, Agent, or Firm—W. G. Fasse

[57] ABSTRACT

An overhead baggage compartment has a lowerable trough, especially for a passenger aircraft, wherein the trough is connected by two quadrilateral bellcrank type levers or links, with the side walls of the trough inside a box-like housing which is open at the bottom and also has two side walls. A substantial weight compensation is achieved by pneumatic springs, whereby each pneumatic spring (14) works on an adjustable attachment point on the corresponding quadrilateral bellcrank link through a guide roller 15. During loading of the trough 3, its weight is so determined and the pneumatic spring 14 is so swivelled by a weighing lever 13, that the guide roller 15 is placed on the corresponding quadrilateral bellcrank link at an attachment point chosen according to the determined weight. It is a special advantage that closing of the baggage compartment only requires a minimal manual force which is largely independent of the weight of the trough.

15 Claims, 5 Drawing Sheets

OVERHEAD BAGGAGE COMPARTMENT WITH A LOWERABLE TROUGH

FIELD OF THE INVENTION

The invention relates to an overhead baggage compartment with a lowerable trough, especially for a passenger aircraft.

BACKGROUND INFORMATION

Baggage compartments with lowerable troughs are usually arranged above the middle seating group in a passenger cabin. The facility to lower the troughs, on the one hand, does not restrict the passenger's freedom of movement when the troughs are in the closed, lifted position. On the other hand, the storing and removal of baggage is comfortably achieved when the troughs are lowered.

U.S. Pat. No. 4,275,942 (Steidl) discloses an overhead baggage compartment with a lowerable trough for the storing of baggage. The trough is connected by two quadrilateral bellcrank type links to the inside of a box-like housing which is open at the bottom and has two side walls, so that the trough can be swivelled downwardly out of its closed stowed position into its open loading and unloading position. Each quadrilateral bellcrank link comprises an upper lever and a lower lever, whereby the joints are arranged in their front regions almost vertically above one another to connect both of these levers to the corresponding side walls. During the swivelling out into the open position, the trough carries out a coupling movement. The pivot joints on the trough side are chosen, so that the loading opening of the trough in its pulled-down and swivelledout position, is fully accessible. A pneumatic spring is provided, which is intended to work against the weight of the load and thereby should support the closing of the compartment. This pneumatic spring works on the upper lever and is supported by the pivot joint of the lower lever which is connected to the housing. The connecting pivot point of the pneumatic spring on the upper lever is so arranged that the line of force application of the pneumatic spring in the opened position of the trough, runs through the pivot joint of the upper lever on the housing side. In the closed position of the baggage compartment, this line of force application has its largest distance from said pivot joint. Thus, during closing of the baggage compartment, a growing moment becomes effective on the upper lever and reaches its maximum moment in the closed position. This moment is so directed that it supports the closing movement. This moment, while aiding the manual force needed to close the baggage compartment, even when the trough is loaded with baggage, opposes and thereby increases the manual force needed to open even the empty baggage compartment.

OBJECTS OF THE INVENTION

In view of the foregoing it is the aim of the invention to achieve the following objects singly or in combination:

to construct an overhead baggage compartment with a lowerable trough, so that only a minimal operating force is needed, substantially independently of the size of the load and position of the trough;

to construct the linkage with a view to achieving an optimal mechanical advantage so that closing of the baggage compartment requires only a minimal operating force;

to make sure that practically no operating force is needed to open the baggage compartment by taking advantage of its weight;

to provide a feature which will automatically compensate changes due to aging of the pneumatic spring; and to provide a feature that makes the operating force for closing the baggage compartment adjustable.

SUMMARY OF THE INVENTION

An overhead baggage compartment, especially for a passenger aircraft, according to the invention combines a lowerable trough with a box type housing which is open at the bottom and has two side walls. The trough is connected by two quadrilateral bellcrank links with the side walls inside the box-like housing, whereby the trough can be swivelled downwardly out of its closed, stowed position into an open loading position. Each quadrilateral bellcrank link comprises an upper and a lower lever pivoted or journalled to the respective side wall. A pneumatic spring is provided for each quadrilateral bellcrank link to work against the weight of the trough. Each pneumatic spring cooperates with the corresponding quadrilateral bellcrank link through a guide member such as a roller. A weighing system or mechanism comprising a weighing lever, a spring, and a weighing pin is connected to each end side of the trough. Each weighing system determines the weight of the trough during loading of the trough and swivels the respective pneumatic spring through the corresponding weighing lever, so that the guide member or guide roller is shifted on the corresponding quadrilateral bellcrank link to an operative connecting point chosen according to the determined weight or in accordance with the determined weight, whereby a respective mechanical advantage for said penumatic gas spring corresponds substantially to said determined weight. Preferably, the locations of the journal or pivot points of the upper and lower bellcrank links or levers on the respective side walls are so selected that these locations in the front or opening zone are approximately vertically one above the other, and the locations of the pivot points on the trough-side are chosen, so that the loading opening of the trough in its pulled-down and swivelled-out open position is fully accessible.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
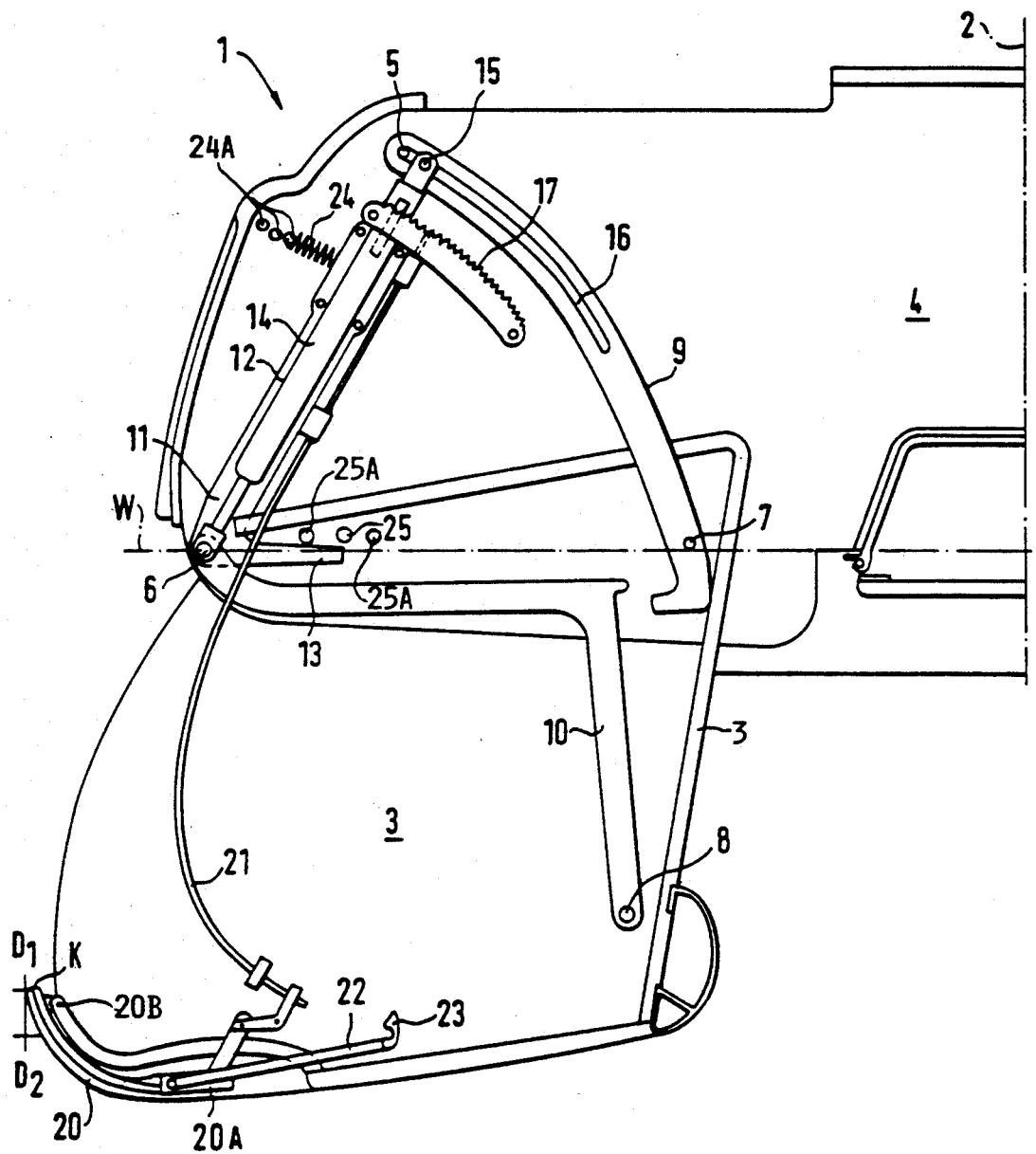
FIG. 1 shows a schematic side view in the longitudinal direction of an empty baggage compartment in its open position.

FIG. 1 shows a baggage compartment 1, seen in the direction of the longitudinal aircraft axis as viewed in the forward or flight direction. Only the left half section of the complete baggage compartment is shown. The right half section is constructed mirror-symmetrically to the center line 2. The trough 3 is in its lowered open position. The complete baggage storage system has a plurality of these troughs 3, each one arranged between two side walls 4. The side walls 4 and the remaining walls of the baggage compartment 1 form a housing for taking up a trough 3. Each trough 3 is guided relative to the side walls 4, through two identical quadrilateral bellcrank links. The linkage visible is the one closer to the bow or forward end of the aircraft. This forward link comprises the pivot joints 5 and 6 connected to the side wall or member 4, and the pivot joints 7 and 8 connected to the trough 3, whereby the joints 5 and 7 are connected to each other by a curved upper lever 9 and the joints 6 and 8 are connected to each other by a lower lever 10. Further, a bell crank 11 comprising a long lever arm 12 and a short weighing lever 13 is journalled to the pivot joint 6. A pneumatic spring 14 is built into the lever arm 12 in such a way, that its piston rod is journalled to the lever arm 12 and so that the cylinder side end of the pneumatic spring 14 can drive in and out opposite the lever arm 12.

The cylinder-side end of the pneumatic spring 14 is equipped with a guide roller 15, which is guided in a curved guide track 16 of the upper lever 9. The guide track 16 is arranged on the upper lever 9, so that it runs nearly concentrically around the pivot point 6 when the trough 3 is in the open loading position. A gear wheel segment 17 is mounted rigidly on the side wall 4 concentrically to the pivot point 6. A blocking or arresting mechanism 18 cooperates with the gear wheel segment 17, whereby the bellcrank 11 can be blocked in nearly any position along its swivelling or tilting range. A locking plate 20 with a lock 20a is pivoted at 20B underneath the trough 3. Upon manipulating the locking plate 20, the plate 20 works on a Bowden cable 21. Upon manipulating the lock 20A, it works on a linkage 22.

The Bowden cable 21 is connected with the blocking mechanism 18, so that the swivelling or tilting motion of the bellcrank 11 is blocked when tension force is introduced through the Bowden cable 21. Two locking hooks 23 are arranged to the side of the trough 3. These hooks are operationally connected with the lock 20A by the linkage 22. Due to a spring 24, a moment that torques counterclockwise around the pivot joint 6, works on the lever arm 12 with the pneumatic spring 14. A weighing pin 25 is rigidly secured to the trough 3. The trough 3 passes through the shown position during lowering of the trough 3, shortly before reaching the resting fully open position. Thereby, the front edge K of the trough 3 has the distance $D_1$ from a housing-fast horizontal W. The resting position of the trough 3 is achieved, when the weighing pin 25 and thereby the weight of the trough 3 rests on the weighing lever 13 of the bellcrank lever 11. In this position, the front edge K has a distance from the horizontal W with a value between $D_1$ and $D_2$, whereby the weight of the trough 3 exerts a counterclockwise rotating moment or torque on the bellcrank 11, so that the guide roller 15 takes up the position shown. In this position of the guide roller 15 the pneumatic spring 14 exerts a moment that torques counter-clockwise around the pivot point 5 on the upper lever 9, which works against the force caused by the weight of the trough 3 and nearly compensates for it.

If the baggage compartment 1 is now to be closed, an upward manual force is exerted on the locking plate 20, whereby the pulling movement is transferred to the Bowden cable 21, which in turn operates the blocking mechanism 18. This feature makes sure that the position of the guide roller 15 relative to the pivot point 5 that results from the trough weight, is hereby maintained while the closing operation continues. Consequently, the manual force needed to close the trough 3 is relatively small, since only a small portion of the trough weight and the friction resistance must be overcome. Upon passing the distance D, blocking of the bellcrank 11 is automatically assured, so that this blocking is independent from the position of the Bowden cable 21. When the closed position is achieved, the locking hooks 23 automatically lock in, whereby the trough 3 is locked in its stowed closed position.

Figure 2:
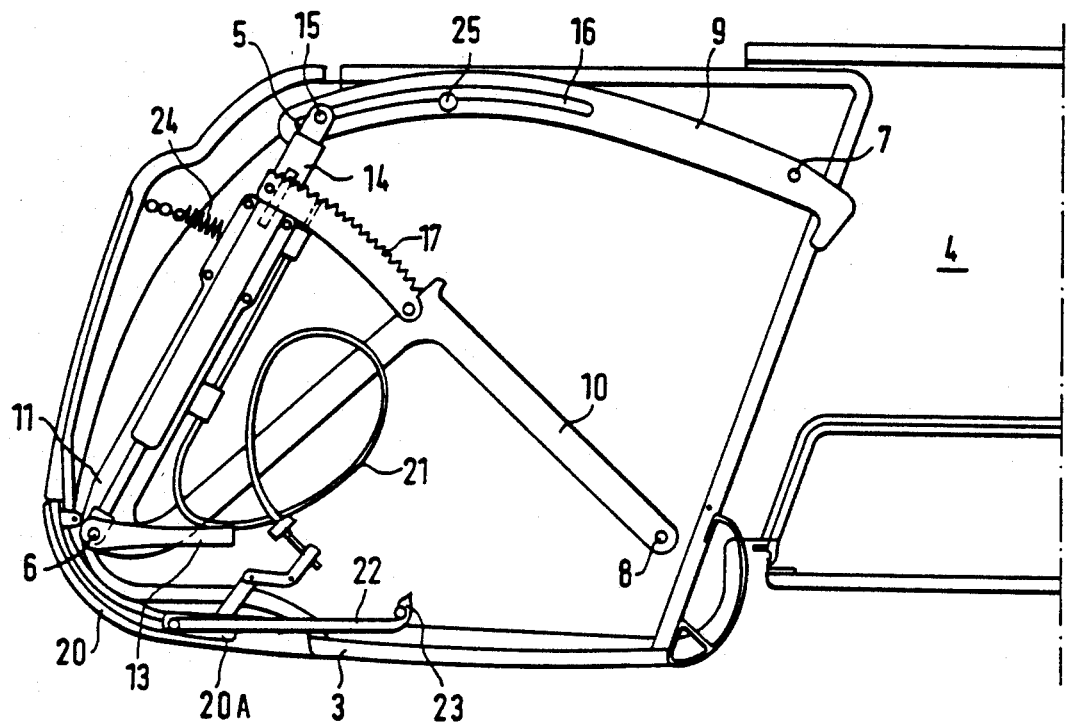
FIG. 2 is the baggage compartment of FIG. 1 in its closed position.

FIG. 2 shows the empty baggage compartment of FIG. 1 in its closed position. The weighing pin 25 thereby no longer rests on the weighing lever 13. Due to the blocking mechanism 18, the pneumatic spring 14 is still in the same position as in FIG. 1 opposite the gear wheel segment 17. Should the trough 3 now be opened to be loaded, it is enough to disengage the locking hooks 23 by activating the lock 20A with a downwardly directed manual force. The trough 3 then travels automatically into its loading position, whereby the blocking mechanism 18 still remains in meshing engagement with the gear wheel segment 17. Shortly before reaching the open loading position the blocking mechanism 18 is automatically released, as will be described below. Thus, the weighing pin 25 and the bellcrank 11 again form the configuration shown in FIG. 1, in which the weight of the trough 3 is basically compensated by the opposing moment of the pneumatic spring 14 that works on the upper lever 9.

Figure 3:
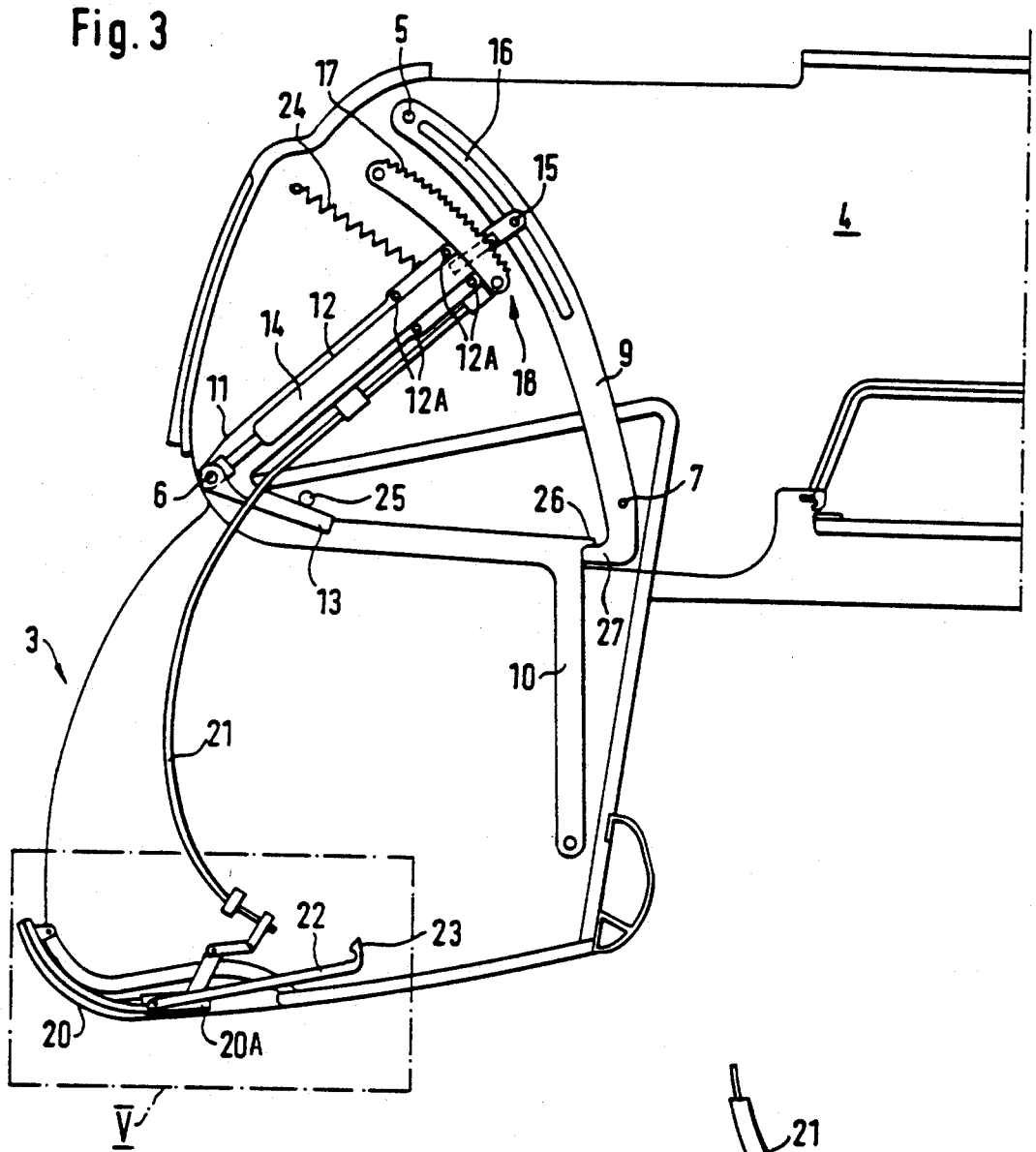
FIG. 3 shows a view similar to that of FIG. 1, but of a loaded baggage compartment in an open position.

FIG. 3 shows the trough 3 in the position when the trough 3 is loaded whereby the bellcrank 11 takes up a position, depending on the weight of the load, opposite the gear wheel segment 17.

The spring 24 is now under more strain, due to the higher loaded weight of the trough 3, and the bellcrank 11 rotates clockwise nearly proportional to the weight, whereby the pneumatic spring 14 also takes up a new position, in which the guide roller 15 engages on the upper lever 9 at a larger distance from the pivot joint 5. As a result, a left or counterclock torque is exerted on the upper lever 9 through the guide roller 15, whereby the weight of the loaded trough 3 is substantially compensated. This compensation is achieved in that the weighing lever 13, the spring 24, and the weighing pin 25, with the trough 3, form a weighing system, which continually determines the weight of the trough 3 and the load during loading, and which works on the pneumatic spring 14 through the bellcrank 11, so that the guide roller 15 takes up an engaging point on the upper lever 9 corresponding to the determined weight.

For limiting the lowering movement, the lower lever 10 has a latch or stop 26, that bears on a hook 27 arranged on the side of the upper lever 9, in the lowest position of the trough 3. This position is attained only through exceeding a load limit, which just about activates a pivoting of the bellcrank 11, without positioning the latch 26 on the hook 27. If the latch 26 does rest on the hook 27, the weighing system described above is not effective and the bellcrank 11 remains in the position that corresponds to the weight of the trough with the largest determinable load. To achieve a guiding of the pneumatic spring, which is as friction-free as possible relative to the lever arm 12, the latter comprises four rollers 12A.

Figure 4:
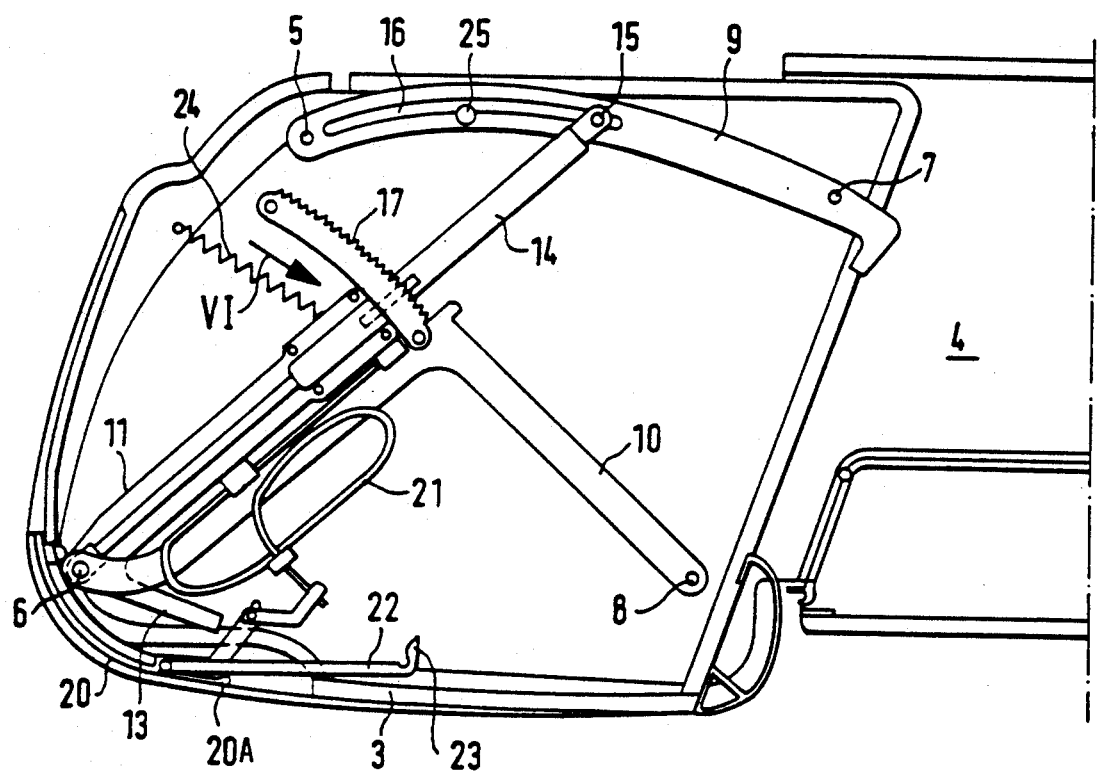
FIG. 4 shows the baggage compartment of FIG. 3 in its closed position.

FIG. 4 shows the loaded trough 3 in the closed position, whereby the weighing pin 25 no longer rests on the weighing lever 13. The pneumatic spring 14, however, is still in the same position as in FIG. 3, opposite the gear wheel segment 17, due to the blocking mechanism 18. Should the trough 3 now be opened for loading, the lock 20A must be disengaged again. The trough 3 then glides into the loading position, whereby the blocking mechanism 18 is still in contact with the gear wheel segment 17. The compensating effect of the pneumatic spring 14 on the weight of the loaded trough 3 is largely effective during the downward movement, whereby a maximum downward speed is not exceeded due to the oil dampers integrated into the pneumatic spring 14. Shortly before reaching the loading position, the blocking apparatus 18 is automatically disengaged, whereby the trough 3 is once again in a balanced or equilibrium position that arises between the weight of the loaded trough 3 on the one hand and the opposing force of the pneumatic spring 14, on the other hand.

Figure 5:
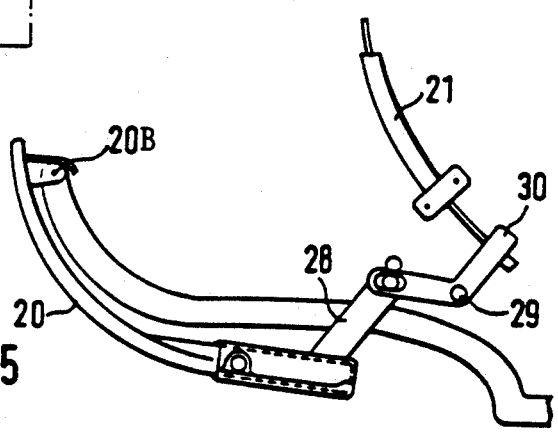
FIG. 5 shows the detail V of FIG. 3 on an enlarged scale.

FIG. 5 shows the detail V from FIG. 3, the force transmission from the locking plate 20 to the Bowden cable 21. The locking plate 20, which is rotatable around a pivot or journal point 20B, has a locking lever 28 that in turn works on a bellcrank 30 which is rotatable around a pivot or journal point 29, so that the bellcrank 30 exerts a pulling force on the pulling cable of the Bowden cable 21, during an upwardly directed manual force on the locking plate 20.

Figure 6:
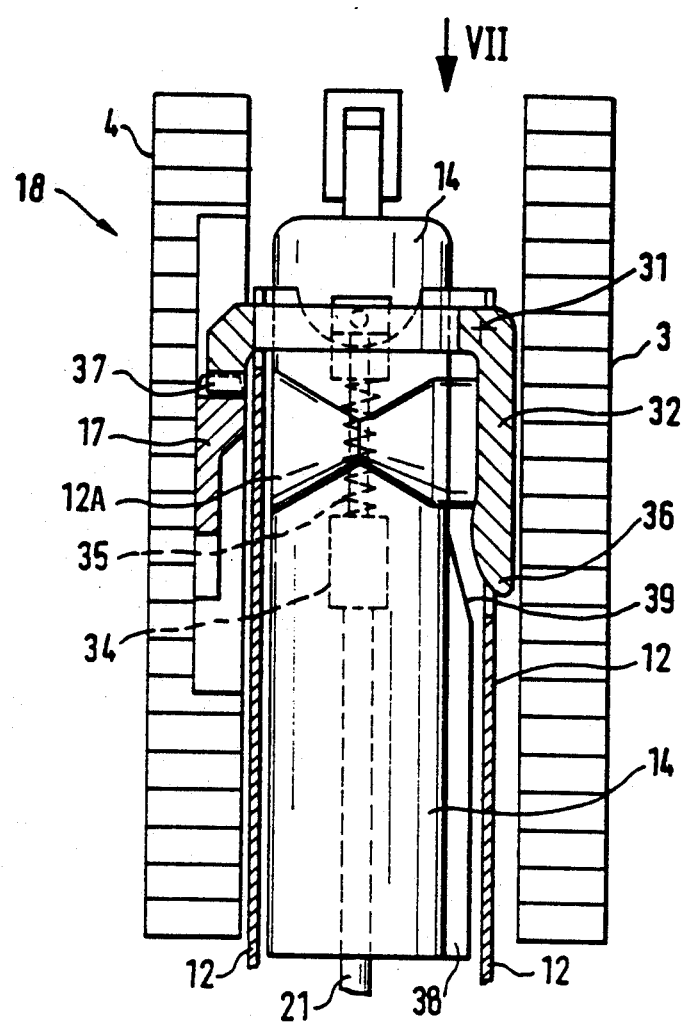
FIG. 6 shows on an enlarged scale a view in the direction of the arrow VI in FIG. 4.
Figure 7:
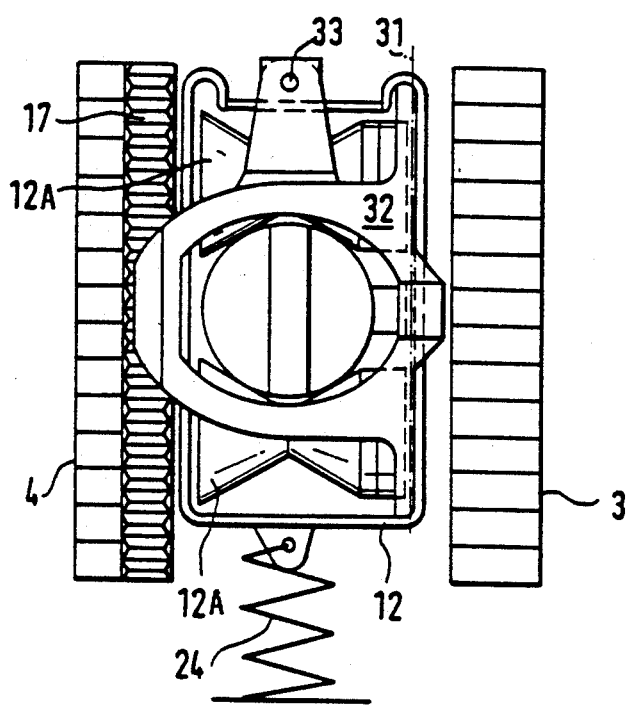
FIG. 7 shows a view in the direction of the arrow VII in FIG. 6.

FIGS. 6 and 7 show a closer view of the blocking apparatus 18 with the side wall 4 having the gear wheel segment 17, the trough 3, the lever arm 12 with the rollers 12A, the pneumatic spring 14, and the Bowden cable 21. In FIG. 6, the Bowden cable 21 is covered by the pneumatic spring 14 and is therefore depicted by a dashed-line. A major part of the blocking mechanism 18 is made up of an angular blocking lever 32 which is journalled on an axis 31. The outer sleeve of the Bowden cable 21 ends in an abutment 34 arranged securely on the lever arm 12, whereas the pulling inner cable of the Bowden cable 21 is connected with an attachment point 33 arranged on the side of the blocking lever 32. A first free lever arm of the blocking lever 32 penetrates into the gap between the pneumatic spring 14 and the trough 3, and carries on its end a glide element 36. The second lever arm of the blocking lever 32 is formed approximately as a ring that has gear teeth 37 on its angular end and that encircles the pneumatic spring 14. A switching bar 38 with a ramp 39 is rigidly secured to the pneumatic spring 14.

According to FIG. 6, a compression spring 35 exerts a torque moment that rotates clockwise or to the right around the axis 31, on the blocking lever 32, whereby, the gear teeth 37 are disengaged from the gear wheel segment 17, so that the pneumatic spring 14 in its loading position can take up a position corresponding to the weight of the trough 3 with or without a load. If a pulling force is now applied to the Bowden cable 21 through the locking plate 20, then the blocking lever 32 takes up the shown position, whereby the gear teeth 37 interlock with the gear wheel segment 17. If the trough 3 is now raised into its upper position, as described above, then the automatic securing of the position of the pneumatic spring 14 into a safety position occurs directly after leaving the weighing position. This safety is achieved through the switching bar 38, that rests against a glide element 36 at the start of the upward movement and that secures the blocking lever 32 in the shown blocked position. Thereafter, the blocking lever 32 remains in this blocked position also in the absence of the pulling force through the Bowden cable 21.

When an abatement in the force of the pneumatic spring occurs due to aging, the trough 3 lowers a greater distance during the weighing procedure which leads to an enlargement of the active lever arm of the pneumatic spring 14 around the point 5. Aging of the pneumatic spring is hereby substantially compensated.

It is possible that different operators of aircraft equipped with the present luggage compartments might have different concepts for the size of the manual force required for lifting the trough 3. Therefore, several mounting locations 25A for the weighing pins 25 are provided, whereby the manual force for lifting the trough 3, is adjustable. More specifically, the weighing pins 25 can be repositioned into any one of these positions 25A and then fixed in any of these several positions located on an approximately horizontally straight line in the loading position of the trough 3.

According to another embodiment of the invention it is provided that attachment points 24A of the weighing springs 24 are arranged on the side walls 4, whereby the springs can be secured to any one of these various positions or points 24A lying approximately in a curve around the fixed pivot joint or point 6.

It should be noted here, that the present weighing system senses the weight or load of the trough to provide a mechanical control for the size of the counter moment provided by the pneumatic spring in accordance with the position of its guide member 15 along the track 16 of the upper lever 9. The weight or load sensor could be any device suitable for this purpose.

Although the invention has been described with reference to specific example embodiments, it will be appreciated that it is intended to cover all modifications and equivalents within the scope of the appended claims.

What we claim is:

1. An overhead baggage compartment, comprising a downwardly open housing with a first side member (4) and a second side member (4) spaced from said first side member, a luggage holding trough (3) tiltably mounted in said housing, first and second lever means (9, 10) forming pivotable quadrilateral first and second links, said first link connecting one end wall of said trough (3) to said first side member of said housing, said second link connecting the other end wall of said trough (3) to said second side member of said housing, each of said first and second links comprising an upper lever (9) and a lower lever (10), and a pneumatic spring means (14) provided for each of said first and second links, first and second fixed pivot points (5, 6) on each of said first and second side members (4) for journalling one end of said first link to said first side member and one end of said second link to said second side member, third and fourth movable pivot points (7, 8) on each of said end walls of said trough (3) for journalling the other end of said first link and of said second link to its respective end wall of said trough (3), a guide member (15) for movably securing one end of said pneumatic spring means (14) to the respective quadrilateral first and second link, at least one trough load weighing mechanism comprising a weighing lever (13), a spring (24) for biasing said weighing lever, and a weighing pin (25) connected to said trough (3) and cooperating with said weighing lever (13), and means (11, 12) connecting said weighing lever (13) to said pneumatic spring means for shifting said guide member (15) of said pneumatic spring means along at least one of said first and second links to such a position that a respective mechanical advantage of said pneumatic spring means corresponds substantially to a weight of said trough as determined by said trough load weighing mechanism.

2. The overhead baggage compartment of claim 1, comprising two trough load weighing mechanisms one at each end of said trough.

3. The overhead baggage compartment of claim 1, wherein said third and fourth movable pivot points (7, 8) where said links are connected to said trough end walls, are positioned in a front area of said trough near a loading opening of said trough and approximately vertically one above the other.

4. The overhead baggage compartment of claim 1, wherein said third and fourth movable pivot points (7, 8) are vertically spaced from each other so as to fully expose a loading opening of said trough (3) when said trough is in a down and open loading position.

5. The overhead baggage compartment of claim 1, wherein said upper lever (9) comprises a guide track (16) for said guide member (15) of said pneumatic spring means (14).

6. The overhead baggage compartment of claim 5, wherein said guide member (15) is a guide roller running along said guide track in response to a trough weight determined by said weighing mechanism.

7. The overhead baggage compartment of claim 1, further comprising a blocking mechanism (18) comprising substantially an angular blocking lever (32) secured to said pneumatic spring means (14), and a gear wheel segment (17) secured to said side member (4), said blocking lever cooperating with said gear wheel segment (17) for locking a swivelling movement of said pneumatic spring means (14).

8. The overhead baggage compartment of claim 7, further comprising a manually operable locking member (20) and an angular Bowden cable (21) operatively connecting said locking member to said blocking mechanism (18) for manually operating said blocking mechanism.

9. The overhead baggage compartment of claim 7, wherein said pneumatic spring means (14) comprise a switching bar (38) with a ramp (39) cooperating with said blocking lever (32).

10. The overhead baggage compartment of claim 5, wherein said guide track for said guide member (15) is arranged on said upper lever (9), so that said guide track (16) runs nearly concentrically around one of said first and second fixed pivot points to which said pneumatic spring means (14) is journalled, when said trough (3) is in its loading, open position.

11. The overhead baggage compartment of claim 1, wherein said weighing pin (25) can be fixed in any one of several positions (25A) located approximately along a nearly horizontal straight line, when said trough (3) is in the loading, open position.

12. The overhead baggage compartment of claim 1, wherein said spring (24) for biasing said weighing lever has attachment points (24A) for securing one end of said springs (24) to said side members (4) and wherein said attachment points (24A) form several positions lying nearly along a curve around one of said fixed pivot points (6).

13. The overhead baggage compartment of claim 1, wherein said first and second fixed pivot points (5, 6) on said side members comprise an upper fixed pivot point (5) to which one end of said upper lever (9) is journalled, and a lower fixed pivot point (6) to which said lower lever (10), said weighing lever (11, 13), and one end of said pneumatic spring means are journalled.

14. The overhead baggage compartment of claim 13, wherein said weighing lever(11) is a bellcrank having a first arm (13) forming said weighing lever and a second arm (12) on which said pneumatic spring means is mounted.

15. The overhead baggage compartment of claim 14, wherein said pneumatic spring means (14) comprises a piston cylinder device with a piston rod having a free end journalled to said lower fixed pivot point (6) and a free cylinder end carrying said guide member (15) riding along a guide track (16) of said upper lever (9).

* * * * *